United States Patent Office 2,749,782
Patented June 12, 1956

2,749,782

AUTOMATIC APPARATUS FOR FEEDING STOCK TO POINT SWAGER OR THE LIKE

David A. Edgecombe, Sidley O. Evans, and Anthony T. Laposki, Beaver Falls, Pa., assignors, by mesne assignments, to The Babcock & Wilcox Company, Jersey City, N. J., a corporation of New Jersey Application June 30, 1950, Serial No. 171,323

8 Claims. (Cl. 78—99)

This invention relates to automatic stock handling apparatus and, more particularly, to automatically operable apparatus for feeding stock to a point swager, or the like, and for discharging the processed stock.

The apparatus of the present invention is particularly designed for efficient and economical feeding of elongated stock, such as metal tubes, bars, rods, and similar metal elements toward a rotary point swager for the purpose of pointing an end of such elements. In particular, the invention apparatus is arranged for control and handling of the stock by one man, as compared to known apparatus in which three or more men are required to feed the stock toward the swager, form a point thereon, and remove the finished or processed stock. While the invention is capable of general use in feeding any elongated elements, such as tubes, rods, and bars, toward a processing machine for mechanical or metallurgical treatment, it will, by way of example only, be more particularly described with reference to the handling of tubes for pointing by a rotary swager.

During the manufacture of welded or seamless tubes, a point is formed on one end of each tube for facilitating the cold drawing or working of the tube. In known operational set-ups, the tubes are taken from a stock pile, and the ends to be pointed are heated to a predetermined temperature in a suitable furnace. When the tube ends are at the right temperature, the tubes are removed from the furnace and placed on a longitudinally reciprocable feeding arrangement which advances the heated end of the tube into a rotary swager. The latter shapes a point on such heated end. The tube must then be withdrawn from the swager, removed from the feeding arrangement, and placed on a storage rack or a conveyor for subsequent cold drawing or forming.

In practice, three men are necessary in order to handle the tubes being pointed. Additionally, in present set-ups it is difficult to determine when the required length of point has been formed on the tube, as well as to adjust for differing point lengths required with different sizes of tubes. As a result the pointing operation has been relatively expensive, both in labor cost and in the cost of refinishing and rejections.

With the apparatus of the present invention, the entire operation is performed automatically under the control of a single operator. All that this operator does is to load tubes from a stock pile onto a chain conveyor assembly, and set the controls in the "automatic" position. The conveyor assembly automatically feeds the tubes one at a time to the swager feeding arrangement, the tube ends being progressively heated by a furnace while being so fed by the conveyor assembly. The feeding arrangement projects the heated end of a tube into the swager, which latter forms a point thereon. The feeding arrangement then withdraws the pointed tube and discharges it to a storage rack or the like. Should a point of the required length not be formed on the tube before the feeding arrangement retracts, the tube is automatically re-fed into the swager one or more times until a point of the required length has been formed. Such required point length can be quickly and easily adjusted for a pre-set value. The controls include a selector switch by means of which each of the separate steps may be individually manually initiated. When the selector switch is on "automatic," the above mentioned automatic cycle is continuously repeated.

For an understanding of the invention principles, reference is made to the following description of a typical embodiment thereof as illustrated in the accompanying drawings.

In the drawings:

Fig. 5-A is an enlarged elevation view of the point length control associated with the swager;

The drawings illustrate, by way of example only, the application of the invention to the pointing of the ends of welded or seamless metal tubes T. Referring to Figs. 1 through 4, the tubes T are stored on suitable means, such as a suitable loading table 11, adjacent which is an operator's platform 12 and an auxiliary control panel 13. The operator transfers one tube at a time from table 11 to chain conveyor assembly 20, alongside which is a heating furnace 15. The tubes are so disposed on assembly 20 that one end of each tube will extend, through an opening 14, into furnace 15 as assembly 20 moves the tubes toward a feeding arrangement 25 for a rotary point swager 30. A main control panel 16 is located adjacent swager 30, and a mirror 17 is provided so that a single operator on platform 12, controlling the operations from auxiliary panel 13, can observe the tubes T in the swager 30.

As described more fully hereinafter, when the handling apparatus is under automatic control, conveyor assembly 20 has an intermittent or step-by-step motion in feeding the tubes T toward feeding arrangement 25. As each tube reaches the end of assembly 20 adjacent arrangement 25, conveyor assembly 20 halts. Pickouts 41, forming part of arrangement 25, remove the leading tube T from assembly 20 onto sloping rails 42, so that the tube T rolls by gravity into assembly 25.

As the tube drops into the assembly, it initiates a control sequence which causes front grips 40 and rear grips 50 to close around the tube. Grips 40 close on the tube with sufficient force to positively advance the tube toward swager 30, but insufficient to prevent slipping and spinning of the tube in the front grips during pointing of the tube. This prevents formation of a twisted point by the swager dies, as would occur were the tube rigidly gripped against all movement. Back grips 50 do not close tightly on the tube, merely forming a ring guide therearound to prevent the tube flailing around during the swaging. At the same time as they are closed, front grips 40 are moved toward swager 30.

The movement of the front grips toward the swager continues until the grips reach a predetermined point, called the forward limiting position. Should a point of the proper length not have been formed on the tube at the limit of forward movement of the front grips, the front grips are opened, retracted to a rear limiting position, and reclosed on the tube. The front grips are then re-advanced toward the swager, until the pointed end of the tube contacts the operator of an adjustably positioned limit switch, such operator extending axially through a hollow driven shaft of the swager. When this limit switch is operated, the front grips are opened, while continuing their advance toward the above mentioned forward limiting position. Upon attainment of such limiting position, the front grips are reclosed on tube T and retracted to the rear limiting position. Limit switch means are provided at the rear limiting position to initiate a control sequence effecting opening of both grip assemblies, and operation of kickouts 43 which swing upwardly (Fig. 2) to discharge the pointed tube into sloping rails 44 down which the tubes roll by gravity into a storage rack 45. If desired, rails 44 may discharge the finished tube onto another conveyor for movement to a further processing point.

Such limit switch means also re-start the conveyor assembly 20 to advance the next tube toward the feeding assembly 25, the front tube on the conveyor assembly having been fed to arrangement 25 simultaneously with discharge of the finished tube therefrom. The operation cycle is then repeated.

Chain-conveyor assembly 20

Assembly 20 may comprise two or more chains 21, each of which is trained over a pair of sprockets 22 and 23. Sprockets 22 and 23 are mounted on suitable supports held in elevated relation by columns 24, and the upper ends of the columns support guide rails 26 for the tubes. Chain 21 carries longitudinally spaced abutments 27 for moving the tubes along rails 26. Adjacent the left rail 26 (as viewed in Fig. 1) is a heating furnace 15 having a slit or opening 14 so positioned that the left ends of tubes T extend into the furnace during travel of the tubes along rails 26.

The shaft 28 mounting the forward sprocket 22 has secured thereto a cam 29 having lugs 31. Lugs 31 are so spaced around the periphery of cam 29 that each lug engages the operator of a limit switch LS–6 when an abutment 27 has advanced a tube T to the entrance ends of rails 42. Limit switch LS–6 opens the energizing circuit for the chain driving motor, so that chain 21 stops its motion until the motor is reenergized as described more in detail hereinafter.

Swager feeding arrangement 25

The leading tube T on conveyor assembly 20 is moved into feeding arrangement 25 by pickouts 41, which are operated simultaneously with kickouts 43 which discharge the pointed tube from the feeding arrangement into rack 45. Pickouts 41 are secured on a transversely extending shaft 32 mounted in bearings 33. A crank arm 34 secured to shaft 32 is connected to the piston 36 of a cylinder 37. This cylinder, when activated, rocks shaft 32 to swing pickouts 41 clockwise (Fig. 2), moving the leading tube T onto rails 41.

Figure 6:
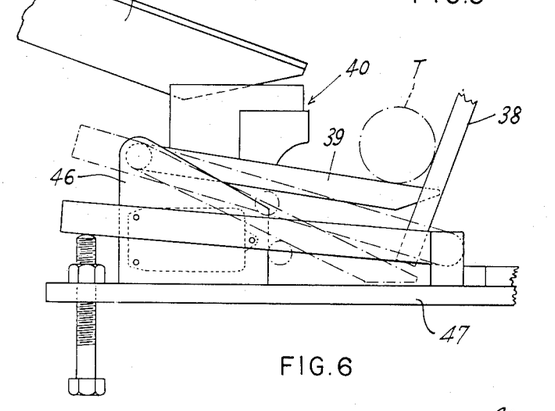
Fig. 6 is a view, on the line 6—6 of Fig. 3, illustrating a tube actuated control for initiating feeding of a tube into the swager.

Referring to Fig. 6, as tube T rolls along rails 42 into feeding arrangement 25, it strikes abutments 38 and depresses a pivotally mounted lever 39. Lever 39 is in engagement with the operator of a limit switch LS–3, and closes this switch whenever a tube T drops into the feeding arrangement. Lever 39 is pivotally mounted on a bracket 46, which, in turn, is mounted on a slide 47 supporting the front grip assembly 40. Slide 47 is longitudinally slidable, along an elevated base 48, toward and away from swager 30, the height of base 48 being such that a tube mounted in grip assembly 40 is axially aligned with the dies of swager 30. The slide is reciprocated by the piston 51 of a hydraulic cylinder 52 mounted on base 48. Grip assembly 40 comprises a fixed front grip 53, fixedly secured on slide 47, and a transversely movable rear grip 54. The latter is moved to and from gripping position by a hydraulic cylinder 55 having its piston rod 56 secured to grip 54. Cylinder 55 is mounted on an extension 57 of base 47.

Sliding base 47 also supports one of the kickouts 43. The latter comprises a radial arm 58 pivotally mounted in a bearing 59 on base 47 and having a vertically extending arcuate extension 61 on its free end. A crank arm 62 is secured to and extends rearwardly from kickout 58, and is secured to the piston rod 63 of a hydraulic cylinder 65. The latter is rockably mounted in a depending bracket 64 secured to the underside of base 47.

Figure 4:
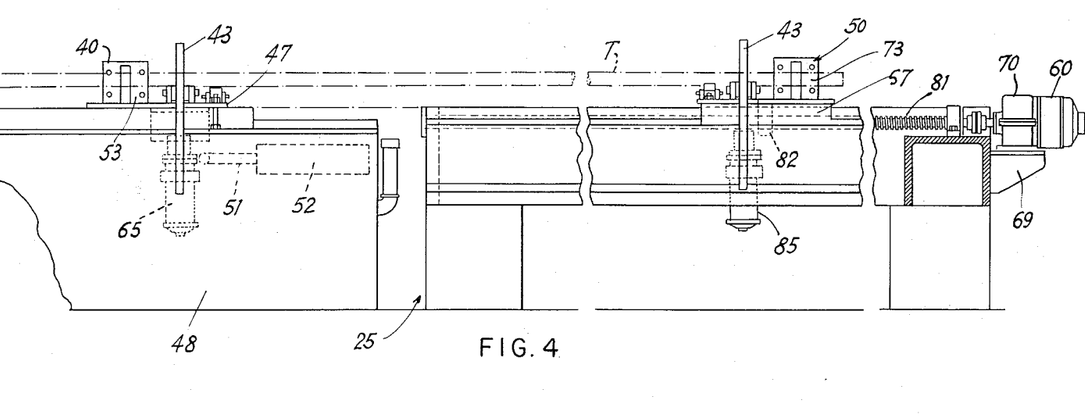

The back grip assembly 50 is substantially the same as the front grip assembly 40 and includes a sliding base 67 which is mounted on an elevated support 68 for adjustment longitudinally thereof. This adjustment is effected by a motor 60 mounted on a bracket 69 at the right end of support 68 (Fig. 4). Through a gear reduction unit 70, motor 60 drives a threaded shaft 81 engaging a nut 82 on the under-surface of sliding base 67. Rotation of shaft 81 effects longitudinal movement of back grip assembly 50 relative to support 68 and swager 30. Such adjustment is for the purpose of advantageously positioning grips 50 to provide a ring guide for different length tubes T.

Grip assembly 50 includes a fixed grip 73 on base 67 which is cooperable with a transversely movable grip 74. The latter is secured to the piston rod 76 of a hydraulic cylinder 75 mounted on an extension 77 of sliding base 67. The kickout 43 associated with the back grip assembly is the same as that associated with the front grip assembly and is pivotally mounted in a bearing 79. A rearward extension 78 of kickout 43 is secured to the piston rod of a hydraulic cylinder 85 mounted in the same manner as cylinder 65.

Swager 30 and the point length adjustment

Figure 5:
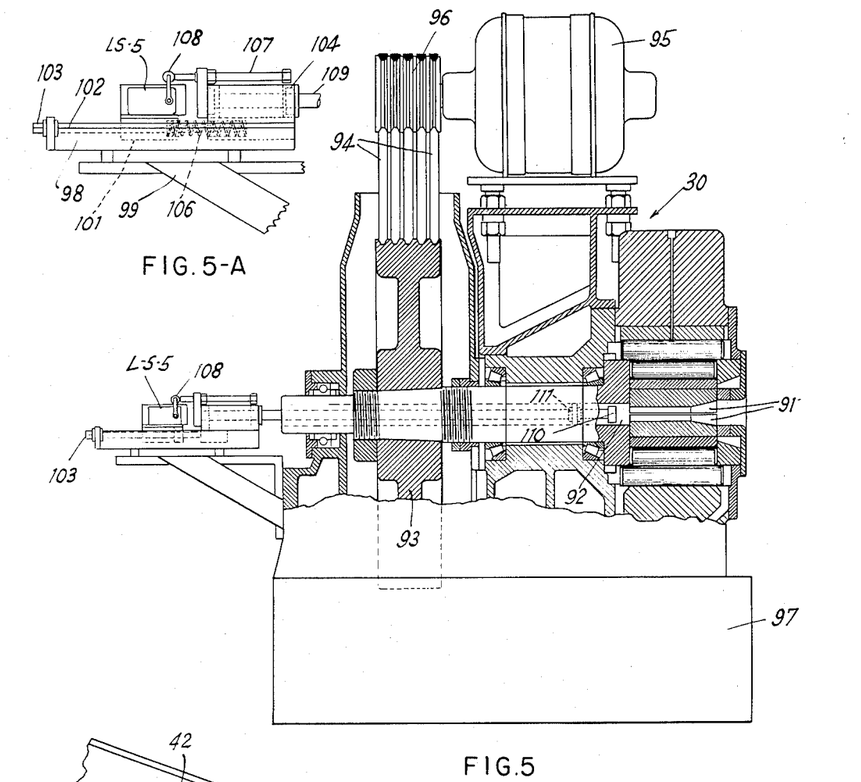
Fig. 5 is an elevation view, partly in section, of the swager and associated point length control.

Referring to Figs. 5 and 5a, swager 30 is a standard rotary swager, such as an "Etna" No. 312 swaging machine, and includes rotating dies 91 secured to a hollow spindle 92 having a pulley 93 on its rear end. Pulley 93 is driven by belts 94 from the driving pulley 96 of a motor 95. The entire arrangement is mounted on a heavy support base 97.

The point length adjustment includes a limit switch LS–5 which is slidably mounted on guides 98 on a bracket 99 secured to the rear end of swager machine 30. Switch LS–5 has a depending nut 101 which is engaged by a threaded screw 102 having an operating screw head 103. By turning screw 102, switch LS–5 may be adjusted toward and away from dies 91 to adjust the point length.

Switch LS–5 is operated by a member 104 slidably mounted on guides 98. A coil spring 106 biases element 104 away from switch LS–5. Element 104 carries a longitudinally adjustable abutment 107 arranged to engage the operator 108 of switch LS–5. A rod 109 is secured to the forward end of element 104 and extends axially through hollow spindle 92, being suitably guided therein by a collar 111. The forward end of rod 109 carries a head 110 adjacent the inner ends of dies 91. Head 110 is arranged to be engaged by the point formed on the tube, as the tube is advanced through dies 91. When the point attains a pre-settable length, rod 109 and element 104 are moved to the left a sufficient amount to operate switch LS–5. In a manner described hereinafter, this effects retraction of the pointed tube from the swager.

Electrical and hydraulic operating and control systems

Figure 7:
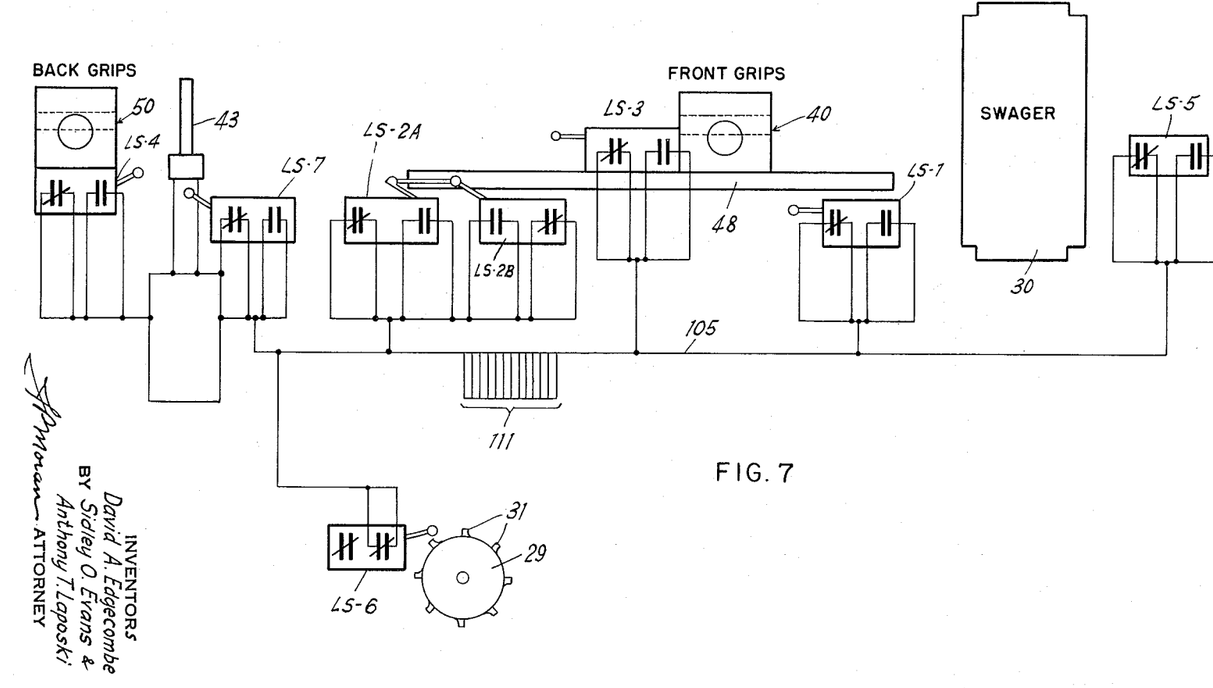
Fig. 7 is a schematic front elevation view of the apparatus illustrating the relative locations of limit switch controls.

The operation of the invention apparatus will be best understood by reference to Figs. 7 through 10. Fig. 7 is a somewhat schematic diagram illustrating the relative location of the several limit switches which control the automatic sequences of operation of the apparatus. In this figure, the various conductors associated with the limit switches are schematically illustrated as joined into a cable 105 which may be brought to a suitable terminal board, such as control panel 16. At the control panel, or at a suitable terminal board, the several conductors of cable 105, shown spread out at 111, are interconnected to each other and to relays, push buttons, solenoid valves, input wires and the like to complete the control circuits.

Figure 9:
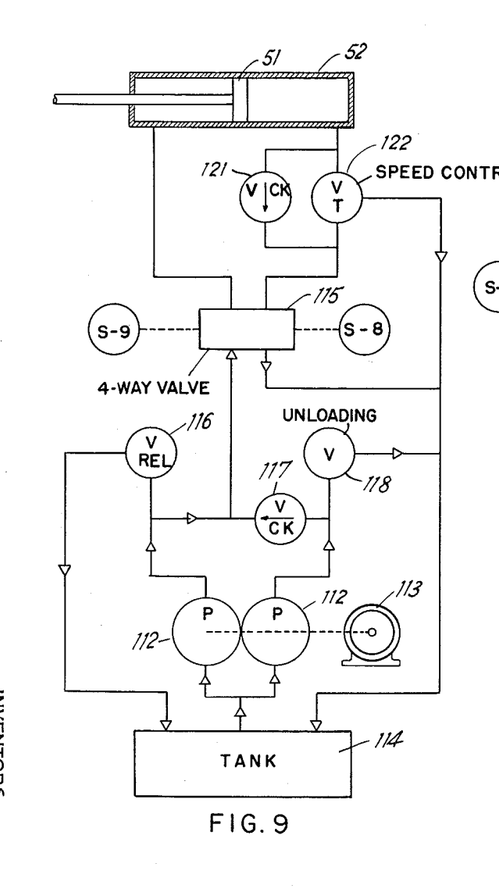
Figs. 9 and 10 are schematic diagrams illustrating the hydraulic controls of the apparatus.
Figure 10:
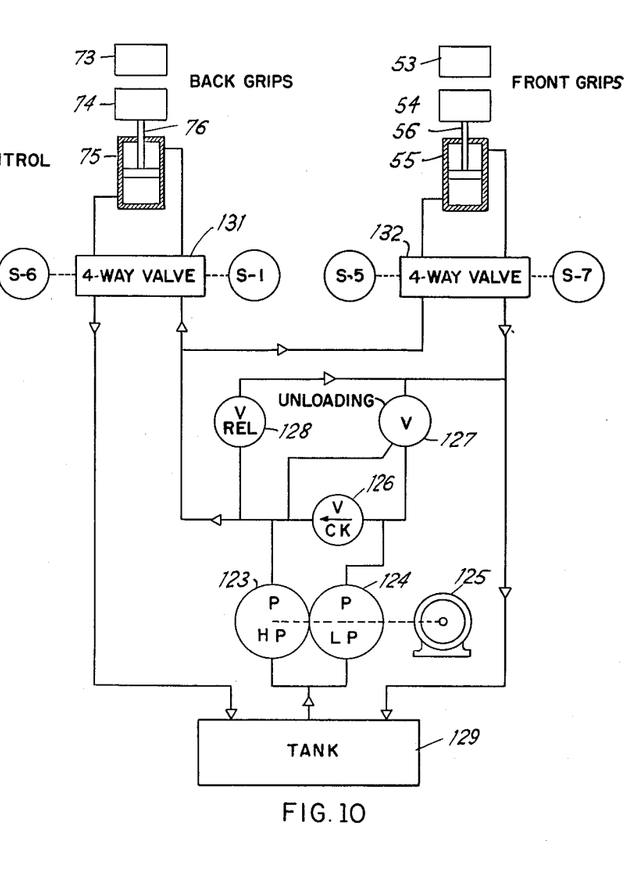

Referring to Figs. 9 and 10, two hydraulic systems are provided for, respectively, feeding front grip assembly 40 relative to swager 30, and opening and closing the two sets of grips. Referring to Fig. 9, which diagrammatically illustrates the hydraulic system for feeding grip assembly 40 relative to the swager, pumps 112, 112, of substantially equal volume and pressure, are driven by a motor 113 to withdraw hydraulic fluid from tank 114 and pump fluid under pressure into 4-way valve 115. The latter may be of any suitable commercial type, such as those manufactured by Vickers, Inc., and designated "CK-2610-AC" or "CK-2630-AC." As the construction of this valve is known to those skilled in the art, it has not been indicated in detail. It should be noted that the left hand pump 112 is provided wih a relief valve 116 discharging into tank 114. The right hand pump 112 forces fluid to valve 115 through a check valve 117, and is provided with an unloading valve 118 discharging back into tank 114. Valves 116, 117 and 118 may be standard commercial valves, such as those manufactured by Vickers, Inc., for example.

Valve 115 is a solenoid operated valve, being provided with operating solenoids S-8 and S-9. When solenoid S-8 is energized, fluid under pressure is directed to the right end of cylinder 52 to force piston 51 to the left, the fluid being exhausted from the left end of the cylinder through valve 115. This action advances grip assembly 40 toward swager 30. The reverse action takes place when solenoid S-9 is energized, piston 51 being moved to the right to retract grip assembly 40. A special valve arrangement is provided so that the rate of feeding of the tube toward the swager may be controlled. For this purpose, a check valve 121 and a throttle, or speed control, valve 122 are connected in parallel with each other between valve 115 and the right end of cylinder 52. During advance of the grip assembly 40 toward the swager, check valve 121 is closed and all the hydraulic fluid must flow through speed control valve 122. The latter may be a suitable throttling valve of a commercial type, such as manufactured by Vickers, Inc., for example. A suitable valve is the "Microfeed" adjustable flow control valve of Vickers, Inc., bulletin 45-35 A. Adjustment of valve 122 controls the rate of fluid flow to cylinder 52 and thus the rate of feeding the tube T to the swager. On retraction of grip assembly 40, check valve 121 provides unrestricted flow of fluid from the right end of cylinder 52 to valve 115 and thus to tank 114.

The hydraulic control circuit for opening and closing the grips, as shown in Fig. 10, includes a double pump unit comprising a high pressure pump 123 and a low pressure pump 124 both driven by a motor 125. Low pressure pump 124 provides a high volume output at low pressure, to provide a rapid closing of grip assemblies 40 and 50, some volume being provided by high pressure pump 123. When the pressure is built up due to closing of the grips, a check valve 126 and an unloading valve 127 conjointly operate to cause the working fluid to be supplied solely by the high pressure, low volume pump 123. This provides a strong closing action of the grips without running an excessive amount of hydraulic fluid through relief valve 128. Correspondingly, excessive heating of hydraulic fluid is avoided and no increased power is required of motor 125.

Control of the opening and closing of the corresponding assemblies is by means of solenoid operated 4-way valves 131 and 132 which may be the same as valve 115. Operation of valve 131 to close the back grips is effected by energization of solenoid S-6, whereas opening of the back grips is effected by energization of solenoid S-1. Similarly, solenoid S-5 operates valve 132 to effect closing of the front grips and solenoid S-7 operates valve 132 to effect opening of the front grips.

Figure 8:
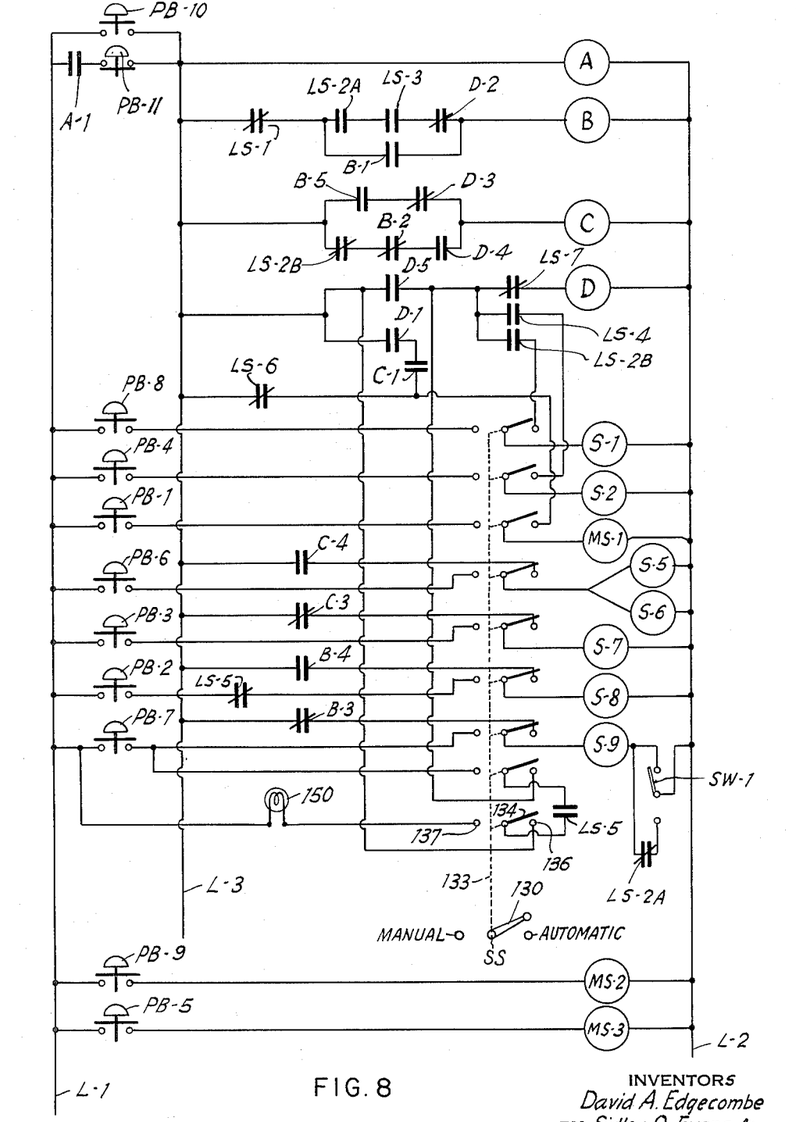
Fig. 8 is a schematic wiring diagram of the selectively manual or automatic control system for the apparatus.

The control circuits are schematically illustrated in Fig. 8. Selection between automatic and manual operation is afforded by a selector switch SS, having control handle 130, schematically indicated as being on a common shaft 133 carrying a plurality of contact arms, such as 134. When handle 130 is swung to the "Automatic" position, arms 134 are engaged with contacts, such as 136, to condition the circuit for automatic position. When handle 134 is swung to the "Manual" position, arms 134 are engaged with contacts 137. These latter contacts are connected to push buttons such as PB-1 through PB-8, by means of which the several functions of the machine may be selectively manually initiated.

Figure 1:
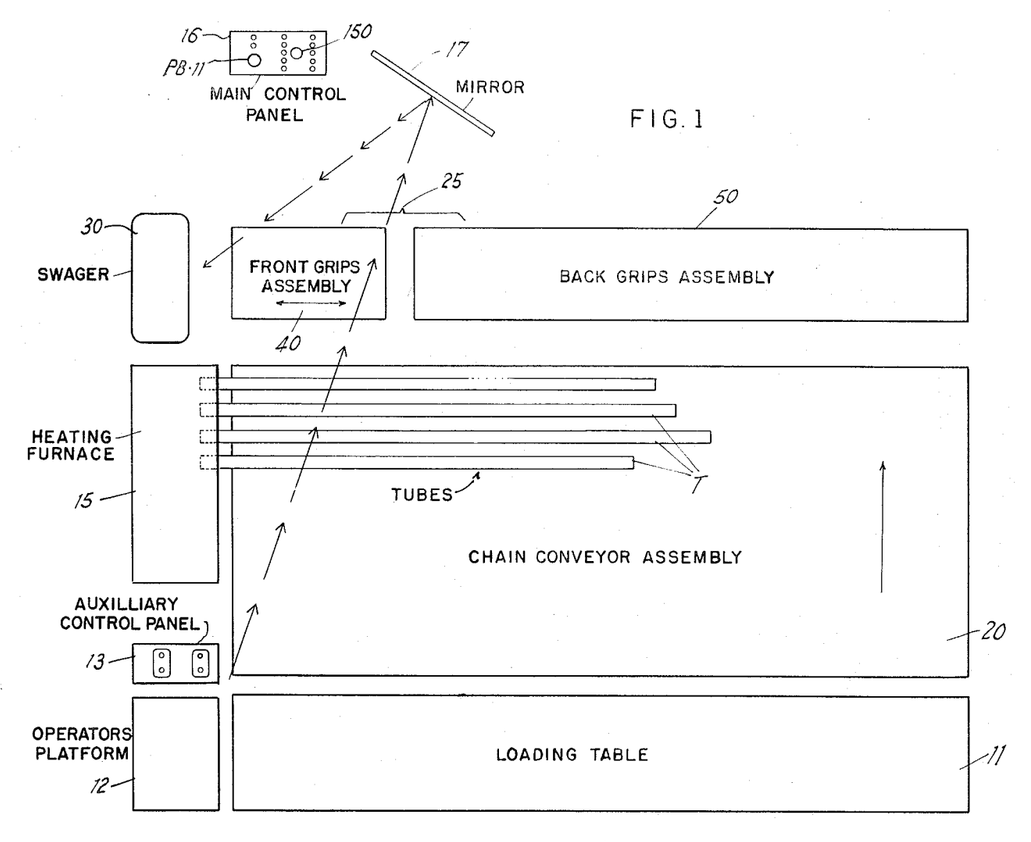
Fig. 1 is a somewhat schematic plan view illustrating the general arrangement of the invention apparatus.
Figure 2:
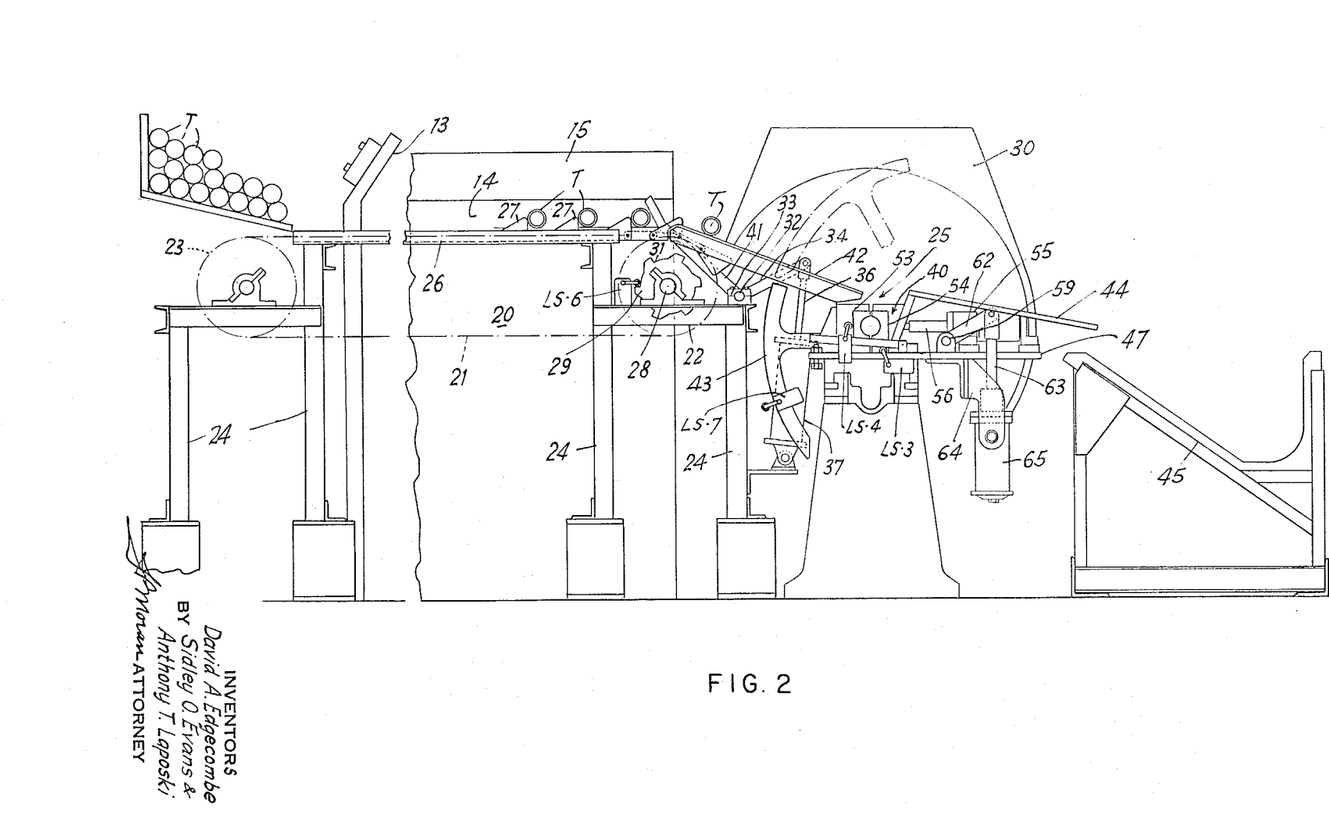
Fig. 2 is a side elevation view of the apparatus looking from the right of Fig. 1.
Figure 3:
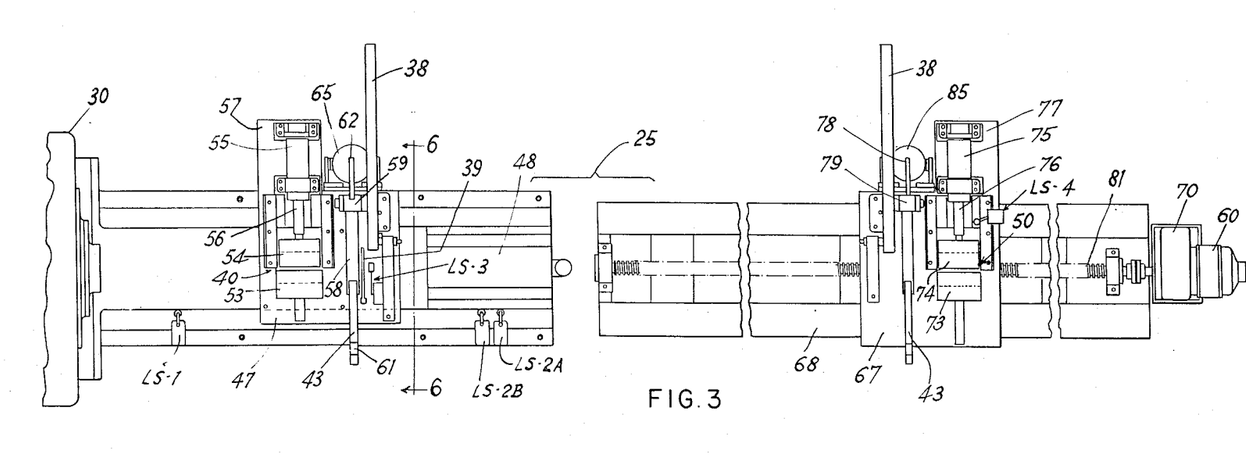
Figs. 3 and 4 are plan and side elevation views, respectively, partially broken away, of the grip assemblies for feeding the tubes into the swager and withdrawing and discharging the tubes.

Energization of the control circuit is provided from mains L-1 and L-2. Automatic operation is set-up by connecting main L-1 to a subsidiary line L-3, with switch SS in the "automatic" position. This is accomplished by operating push button PB-10, which picks-up relay A, and the latter closes its own holding circuit through front contacts A-1 and "stop" push button PB-11. The latter, in practice, is a palm operated type, normally closed push button, arranged for easy access so that operation of the machine may be readily interrupted should an emergency occur. When line L-3 is connected to main L-1, the chain driving motor is energized through a motor starter MS-1, and the chain operates until such time as an abutment 31 of cam 29 opens switch LS-6 (Figs. 2 and 7). The chain then stops, with a tube T at the forward end of rails 26.

The front grips are open, as solenoid valve S-7 is energized by virtue of the closed back contacts C-3 of relay C. Similarly, grip assembly 40 is in the retracted position due to energization of solenoid S-9 through the closed back contacts B-3 of relay B.

As will be described more fully hereinafter, the retraction of the finished tube from the swager has set in operation an automatic control sequence which operates kick-outs 43 to discharge the finished tube and pick-outs 41 to move a new tube T from rails 26 onto rails 42. It should be noted, and will be explained more fully hereinafter, that the back grip assembly 50 is likewise open at this time. Also, limit switch LS-1 at the forward limiting position of grip assembly 40 is closed and limit switches LS-2A and LS-2B, at the back limiting position of grip assembly 40 have been operated. Consequently, switch LS-2A connected to switch LS-2B is closed.

As the new tube drops into the front grips, it strikes lever 39 (Fig. 6) closing limit switch LS-3. This picks up relay B, which holds through its front contacts B-1 and switch LS-1, shunting switches LS-2A and LS-3, and contacts D-2 of relay D. As relay B picks-up, contacts B-2 and B-3 open and contacts B-4 and B-5 close. The opening of contacts B-2 has no effect at this time, and opening of contacts B-3 deenergizes solenoid S-9 controlling the "retract" position of valve 115. Closure of contacts B-4 energizes solenoid S-8, to condition valve 115 to operate cylinder 52 to advance grip assembly toward the swager.

Closure of contacts B-5 picks-up relay C through back contacts D-3 of relay D, thus closing contacts C-1 and C-4, and opening contacts C-3. Closure of contacts C-1 has no immediate effect. Opening of contacts C-3 and closing of contacts C-4 deenergizes solenoid S-7 and energizes solenoids S-5 and S-6, thus closing both grip assemblies 40 and 50 on the tube.

The automatic feeding of a tube to swager 30 is cyclical and repetitive. Front grips 40 close on the tube at the rear limiting position of the grips, the grips are advanced towards swager 30 until the grips reach their forward limiting position, the grips open, and are retracted to their rear limiting position, and the grips are again closed on the tube to repeat the cycle. The foregoing cycle is repeated until such time as a point of predetermined length has been formed on the tube. At such time, limit switch LS–5 is operated by the pointed tube end, which causes the front grips 40 to open during their advance, and to reclose when the front grips operate switch LS–1. The retraction of the front grips then withdraws the tube from the swager.

As front grips 40 reach their forward limiting position, and if such advance is not sufficient to form a point of the pre-set length on the tube, the resulting operation of switch LS–1 drops relay B which, in turn drops relay C through contacts B–5. Closing of contacts B–3 energizes "retract" solenoid S–9 and deenergizes "advance" solenoid S–8. Closing of contacts C–3 energizes solenoid S–7 to open the front grips, with opening of contacts C–4 deenergizing the grips closing solenoids S–5 and S–6.

As the front grips begin to move rearwardly, switch LS–1 recloses but relay B is not picked up as switch LS–2A in its pick-up circuit is open. When the front grips 40 reach the rear position, switch LS–2A is closed to pick up relay B, and the grip closing and tube feeding cycle is repeated.

When a point of the required length has been formed, switch LS–5 is operated, by the tube point engaging head 110 of operator 109, to close a shunt around contacts D–5 and pick up relay D through closed switch LS–7. Relay D then holds through contacts D–5. Contacts D–1 close, but these have no effect on starter MS–1 as contacts C–1 are simultaneously opened by virtue of contacts D3 which drop relay C (contacts B–2 are open as relay B is energized). Opening of contacts D–2 has no effect on relay B as these contacts are shunted by contacts B–1 which are closed. Closing of contacts C–3 energizes solenoid S–7 to open the front grips, and opening of contacts C–4 deenergizes grip closing solenoids S–5 and S–6.

The front grips continue to advance until switch LS–1 is operated, which drops relay B. Closing of contacts B–2 picks up relay C through switch LS–2B and closed contacts D–4. Closing of contacts B–3 and opening of contacts B–4 starts retraction of the forward grips through solenoids S–8 and S–9. Closing of contacts B–5 has no effect on relay C as contacts D–3 are now open.

Closing of contacts C–1 starts the chain motor through starter MS–1, contacts D–1 being now closed, and the chain operates until switch LS–6 is stripped by cam 29. Opening of contacts C–3 and closing of contacts C–4 recloses front grips 40 through solenoids S–5 and S–7. The forward grips now draw the tube out of the swager until the rear limiting position is reached, and switch LS–2 is operated.

Reopening of switch LS–2B in series with contacts B–2 drops relay C, and the closing of switch LS–2B in the circuit of solenoid S–1 energizes the latter to open the back grips. Contacts C–1 open, but the chain operates until switch LS–6 is opened. Closing of contacts C–3 and opening of contacts C–4 operates solenoid valves S–5, S–6 and S–7 to open the front grips. Switch LS–1 has reclosed as the forward grips started to retract.

As the rear grips 50 open, switch LS–4 is closed energizing solenoid S–2 which activates kickout cylinders 65 and 85, and pick-out cylinder 37 to operate kickouts 43 and pick-outs 41. This action discharges the pointed tube from the grip assemblies and moves the next tube onto rails 41 for entrance into the grip assemblies. As kickout 43 swings up, switch LS–7 is operated, opening the circuit for relay D and thus opening contacts D–1, D–4, D–5 and closing D–2 and D–3. Closing of contacts D–2 in the energizing circuit for relay B conditions the circuit for picking up relay B when the new tube closes switch LS–3 as it drops into the grip assembly, switch LS–2A in this pick-up circuit having been reclosed when the front grips reach their rear limiting position. The described pointing operation is then automatically repeated.

The push buttons PB–9 and PB–5 are associated with motor starters MS–2 and MS–3 for motor 60, to operate this motor to adjust the back grip assembly 50 in accordance with different lengths of tube T. The other push buttons PB–1 through PB–8 each initiate manual energization of one of the functions of the machine. Thus, push button PB–1 operates conveyor motor starter MS–1. Push buttons PB–2 and PB–7 control, respectively, the "advance" solenoid S–8 and the "retract" solenoid S–9, a normally closed pair of contacts of switch LS–5 being connected between button PB–2 and solenoid S–8 to interrupt the advance when the point is completed. Push button PB–3 closes the front grips through operation of solenoid S–7. Push button PB–4 operates the pickout 41 and pickouts 43. Push button PB–6 closes the front grips, and push button PB–8 opens the back grips. It will be observed that operation of "stop" push button PB–11 disconnects auxiliary line L–3 from main line L–1 to stop all operations. It should be noted also that switch LS–5 is in shunt with "out" push button PB–7 so that, even in the manual position of switch SS, "out" solenoid S–9 is automatically energized when the point has a pre-set length. An indicating lamp 150 is included in this shunt circuit so that it lights upon closure of switch LS–5 to apprise the operator of completion of the point. The "out" movement may be interrupted short of the rear limiting position of the front grip assembly by moving switch SW–1 to its upward position which cuts out limit switch LS–2A.

While a specific embodiment of the invention has been shown and described in detail to illustrate the application of the invention principles, it should be understood that the invention may be otherwise embodied without departing from such principles.

We claim:

1. In combination with a machine for treating the ends of elongated metal articles, handling apparatus positioned and arranged to feed the articles to the machine for treatment and comprising grip means arranged to receive and grip an article and movable, in alignment with the article, toward and away from the machine; first operating means for advancing and retracting said grip means relative to the machine; second operating means for opening and closing said grip means on an article; a first control element operable by an article received in said grip means; a second control element operable by said grip means at the limit of retraction of the latter; said first and second control elements, when jointly operated, conjointly actuating said second operating means to close said grip means on an article and said first operating means to advance said grip means toward said machine; a third control element operable by said grip means at the limit of advance thereof to conjointly actuate said second operating means to open said grip means and said first operating means to retract said grip means from said machine; whereby, when an article is received in said grip means, the latter are cyclically closed and advanced and then opened and retracted to feed the article repetitively toward the machine; and a fourth control element located in the path of an article fed to the machine and operable by the article when a predetermined length of the end of the latter has been treated; said fourth control element, when operated by the article, actuating said second operating means to open said grip means; said third control element, when operated subsequent to operation of said fourth control element, conjointly actuating said second operating means to close said grip means and said first operating means to retract said grip means to withdraw the article from the machine; said second control element, when operated subsequent to operation of said fourth control element, actuating said second operating means to open said grip means and de-activating said first operating means.

2. Handling apparatus as claimed in claim 1 in which said grip means comprises forward grip means operable by both said first and second operating means, and rear grip means; and third operating means for opening and closing said rear grip means; said third operating means being actuated by said first control element, when operated, to close said rear grip means, and by said second control element, when operated subsequent to operation of said fourth control element, to open said rear grip means; said forward grip means frictionally engaging the article and said rear grip means loosely embracing the article to limit lateral movement of the rear portion thereof.

3. Handling apparatus as claimed in claim 2 in which the machine is a rotary point swager, the articles are tubes, and said rear grip means inhibit whipping of the rear end of the tubes during pointing of the forward ends thereof.

4. Handling apparatus as claimed in claim 1 in which said control elements comprise limit switches controlling energizing circuits for said operating means.

5. Handling apparatus as claimed in claim 1 in which said operating means comprise fluid pressure actuators controlled by solenoid operated valve means, and said control elements comprise limit switches controlling energization of said valve means.

6. Handling apparatus as claimed in claim 1 in which said grip means comprises first grip means operable by both said first and second operating means, and second grip means; third operating means for opening and closing said second grip means; said third operating means being actuated by said first control element, when operated, to close said second grip means, and by said second control element, when operated subsequent to operation of said fourth control element, to open said second grip means; mechanism operable to eject an article from said grip means; fourth operating means for said mechanism; and a fifth control element operable responsive to opening of said second grip means; said fifth control element, when operated subsequent to operation of said fourth control element, actuating said fourth operating means to operate said mechanism to eject the article from said grip means.

7. Handling apparatus as claimed in claim 6 including mechanism operable to feed an article into said grip means; said second-named mechanism being operated by said fourth operating means conjointly with operation of said first-named mechanism; and said fifth control element, when operated subsequent to operation of said fourth control element, actuating said third operating means to operate both of said mechanisms to eject the article from said grip means and to feed an article into said grip means.

8. Handling apparatus as claimed in claim 7 in which said first-named mechanism comprises conveyor means movable laterally toward the line of movement of said grip means and arranged to move the articles laterally into said grip means; and including a heating furnace means extending along the side of the conveyor means nearest the machine to progressively heat the ends of the articles to be treated.

References Cited in the file of this patent

UNITED STATES PATENTS

| | | |
|---|---|---|
| 1,318,378 | Hansen | Oct. 14, 1919 |
| 1,683,661 | Felding | Sept. 11, 1928 |
| 2,210,531 | Engelbaugh et al. | Aug. 6, 1940 |
| 2,359,167 | Somes | Sept. 26, 1944 |

FOREIGN PATENTS

| | | |
|---|---|---|
| 618,402 | Great Britain | Feb. 21, 1949 |